United States Patent Office 2,994,019
Patented July 25, 1961

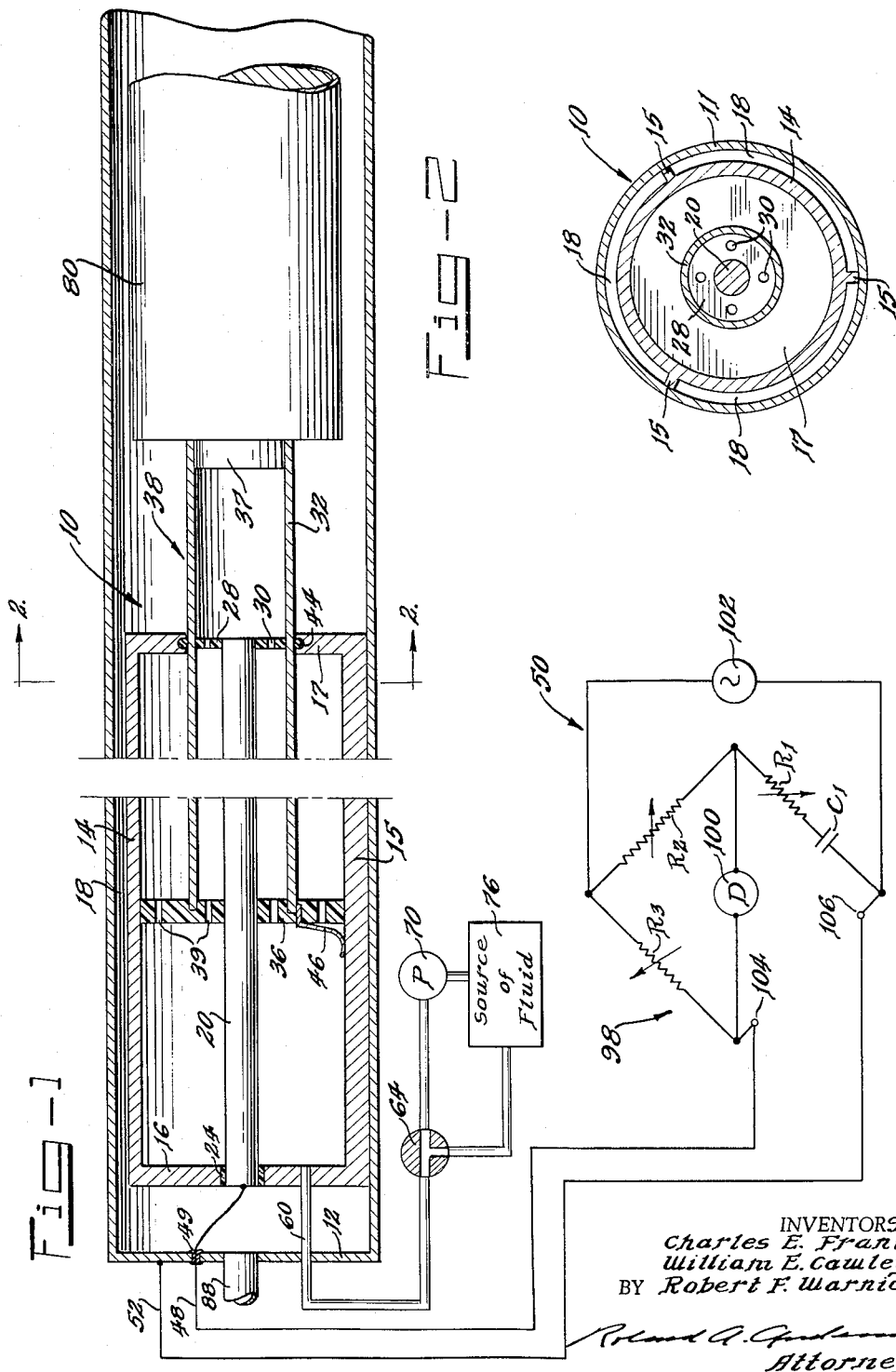

2,994,019
INTEGRAL POSITIONING AND INDICATING DEVICE
Charles E. Frantz, William E. Cawley, and Robert F. Warnick, Richland, Wash., assignors to the United States of America as represented by the United States Atomic Energy Commission
Filed Jan. 19, 1959, Ser. No. 787,785
2 Claims. (Cl. 317—246)

This invention relates to an indicator of the capacitance type. More specifically, the invention relates to an integral positioning and indicating device.

Many means have been devised to indicate the position of an object that is inaccessible to the eye, relative to a reference point or plane. Included among such means are devices which vary an electrical resistance, inductance, or capacitance as the position of the object is changed relative to a reference point or plane. One or more rather marked disadvantages or limitations exist, however, in all present position-indicating devices of the aforesaid class.

One disadvantage of present position indicators that rely on a variable electrical parameter for sensing position lies in their size and complexity. Another disadvantage of present position indicators that operate by virtue of a variable electrical parameter is their low sensitivity at either the upper or lower portions of the range of operation. A further disadvantage of present position indicators of the variable electrical parameter type is their random reliability. Still another limitation of many present position indicators of the variable electrical parameter type is the nonlinear relationship of the visually perceived parameter to the position of the object being monitored.

The integral positioning and indicating device of the present invention substantially eliminates the disadvantages and limitations stated above. This is accomplished by providing a hollow metal cylinder, a metal rod mounted fixedly along the axis of the cylinder and insulated therefrom, and a hollow shaft slidably mounted between the cylinder and the rod and insulated from the latter, one end of the shaft being disposed between the cylinder and rod and the other end extending therefrom to be connected to an object whose position is to be monitored. Means to measure the combined electrical capacitance between the rod and the cylinder and between the rod and the shaft are connected thereto to yield a measure of the object's position, while means to move the shaft by pressure fluid in the cylinder are connected thereto to position the object.

One object of the present invention is to provide an integral positioning and indicating device.

A further object of the present invention is to provide an integral positioning and indicating device that has a high and substantially uniform sensitivity over its entire range of operaton.

Still another object of the present invention is to provide an integral positioning and indicating device that causes an electrical capacitance to vary in a direct linear fashion with the position of an object to be monitored.

Other objects of the present invention will come to light upon perusal of the following detailed description and the attached drawings in which:

FIG. 1 is a view, partly schematic and partly sectional, of an integral positioning and indicating device made in accordance with the present invention; and FIG. 2 is a sectional view taken along line 2—2 of FIG. 1.

In FIG. 1, a positioner 10 is shown within a coolant tube 11 having an end 12. Positioner 10 includes a first electrode in the form of a hollow metal cylinder 14 having spaced exterior longitudinal bosses 15 and inwardly extending end portions 16 and 17. Bosses 15 are parallel to the axis of cylinder 14 and are joined or press-fitted in tube 11 to thereby mount the cylinder in the tube. The outside diameter of cylinder 14, except for bosses 15, is less than the inside diameter of tube 11 so that passages 18 for coolant flow are formed therebetween by the bosses.

Positioner 10 also includes a second electrode in the form of a metal rod 20 fixedly mounted within cylinder 14. One end of rod 20 is retained by inwardly extending end portion 16 of cylinder 14 through a dielectrical bushing 24 which fits tightly within the end portion around the rod. The other end of rod 20 is joined to an annular dielectrical disk 28 provided with holes 30 and fixedly mounted on the rod to lie in a plane that passes through inwardly extending end portion 17 of cylinder 14.

Positioner 10 also includes a third electrode in the form of a hollow metal shaft 32 that is slidably mounted between cylinder 14 and rod 20 in contact with the inner periphery of end portion 17 and the outer periphery of disk 28. One end of shaft 32 is disposed between cylinder 14 and rod 20, while the other end of the shaft lies outside the cylinder beyond end portion 17 thereof. The end of shaft 32 that is disposed between cylinder 14 and rod 20 is joined to an annular dielectrical guide 36; the other end of the shaft 32 is closed by a plug 37. Shaft 32, guide 36, and plug 37 may be considered to comprise a piston 38.

The outer periphery of guide 36 is in slidable contact with the inner surface of cylinder 14, and the inner periphery of the guide is in slidable contact with the rod 20. Further, guide 36 is provided with openings 39. An annular seal 44, fitted in the inner periphery of end portion 17 of cylinder 14 around rod 20, prevents fluid leakage therebetween. The construction of cylinder 14, rod 20, disk 28, shaft 32, and guide 36 is thus seen to permit to-and-fro motion of piston 38 in the cylinder.

End portion 17 of cylinder 14 is in electrical contact with shaft 32 and electrical contact between the cylinder and the shaft is further provided by a spring contact 46, which slides in the cylinder and is joined to the end of the shaft at guide 36. Thus, cylinder 14 and shaft 32 will always be at the same electrical potential with respect to rod 20.

Cylinder 14, rod 20, shaft 32, and tube 11 may be made of aluminum, while bushing 24, disk 28, and guide 36 may be made of a tetrafluoroethylene polymer (Teflon).

An electrical lead 48, which passes through a sealing and insulating grommet 49 in end 12 of tube 11, is connected between rod 20 and an indicator in the form of an electrical capacitance meter 50. An electrical lead 52 is connected between tube 11 and meter 50. Since tube 11 is electrically connected to cylinder 14 through bosses 15, and the cylinder to shaft 32 through spring contact 46, the cylinder and shaft are also tied electrically to lead 52.

Pressure fluid is supplied to the interior of piston 38 via holes 39 and 30 and to the space in cylinder 14 between end 16 thereof and guide 36 through a conduit 60, which extends through end 12 of tube 11 and is joined to end 16 of cylinder 14. Conduit 60 is connected to a three-way valve 64, which is also connected to a pump 70 and a fluid source 76. Valve 64 and source 76 are also directly connected to one another. The function of these elements will unfold as this disclosure progresses.

An object 80, which is to be positioned and whose position is to be monitored on meter 50 abuts, and may be connected to, the end of piston 38 lying outside cylinder 14. Object 80 may be a neutron absorber in the form of a single element such as a control rod or a plurality of elements such as poison slugs in abutting end-to-end relationship. Such neutron absorber would be made to extend to the right as viewed in FIG. 1 in tube 11 from piston 38 into the core of a nuclear reactor, such as those described in Fermi et al., Patent No. 2,708,656, issused May 17, 1955. A coolant pumped from right to left as viewed in FIG. 1 through tube 11 would pass over object 80 and cylinder 14 and out through a conduit 88, connected to end 12 of the tube.

Flow of coolant in tube 11 acts against object 80 to urge pistons 38 toward end portion 16 of cylinder 14. Movement of piston 38 in this direction is prevented by setting valve 64 so that conduit 60 leading from cylinder 14 is blocked from pump 70 and source 76. Thus object 80 is held against movement within tube 11.

In this setting, valve 64 connects pump 70 with source 76, so that the pump output is bypassed back to the source.

When object 80 is to be moved toward the left as viewed in FIG. 1, valve 64 is set so that conduit 60 is connected directly through valve 64 to source 76 and the output of pump 70 is bypassed by the valve back to the source. Now the coolant flowing in tube 11 moves object 80 to the left.

When object 80 is to be moved to the right as viewed in FIG. 1, valve 64 is set so that the output of pump 70 flows through the valve and conduit 60 to cylinder 14 and is blocked by the valve from flowing back to source 76.

Meter 50 indicates the combined electrical capacitance between rod 20 on the one hand, and cylinder 14 and hollow shaft 32 on the other hand. The magnitude of such capacitance depends on the position of guide 36 and thus on object 80 which is to be monitored. When guide 36 is at end portion 17 of cylinder 14, the capacitance is that between rod 20 and cylinder 14. When guide 36 is at end portion 16 of cylinder 14, the capacitance is greater, being that between rod 20 and hollow shaft 32. When guide 36 is in an intermediate position, the capacitance measured is between the values measured in the extreme positions of piston 38 and is a function of the distances between the guide and end portions 16 and 17 of cylinder 14.

At any position of guide 36 the total capacitance is, except for the effects of the guide and end portions 16 and 17 of cylinder 14, the sum of the capacitance between rod 20 and the cylinder and the capacitance between the rod and shaft 32. The capacitance between rod 20 and cylinder 14 is directly proportional to the distance (X) between guide 36 and end portion 16 and to the reciprocal ($A_1$) of the natural logarithm of the ratio of the internal diameter of the cylinder and the diameter of the rod. The capacitance between rod 20 and shaft 32 is directly proportional to the reciprocal ($A_2$) of the natural logarithm of the ratio of the internal diameter of shaft 32 to the diameter of the rod and directly proportional to the distance ($L-X$) that the shaft protrudes beyond end portion 17 into cylinder 14, L being the total possible travel of guide 36 in the cylinder and X being the distance between the guide and end portion 16 of the cylinder. Thus total capacitance, ignoring the contributions of guide 36 and end portions 16 and 17, is given by:

(1) $$C_T = K[A_1 X + A_2(L-X)]$$

or (2) $$C_T = K[A_2 L + (A_1 - A_2)X]$$

Since rod 20, cylinder 14, and shaft 32 are fixed in size, $A_1$ and $A_2$ are constants. When guide 36 is at end portion 16 of cylinder 14, $X=0$ and $C_T=A_2KL$; when the guide is at end portion 17 of the cylinder, $X=L$ and $C_T=A_1KL$.

Meter 50 consists of an electrical capacitance (Wien) bridge 98, a detector 100, and a source of A.C. potential 102. Bridge 98 has a variable resistance $R_1$ and a fixed capacitance $C_1$ in one arm, a variable resistance $R_2$ in a second arm, a variable resistance $R_3$ in a third arm, and input terminals 104 and 106 in a fourth arm. The series equivalent capacitance and resistance of positioner 10, $C_T$ and $R_T$ respectively, are connected to input terminals 104 and 106 via leads 48 and 52 from the positioner. The series equivalent capacitance and resistance, $C_T$ and $R_T$ respectively, at balance are:

(3) $$C_T = C_1 \frac{R_2}{R_3}$$

and (4) $$R_T = \frac{R_1 R_3}{R_2}$$

If $R_3$ is made fixed, then $R_2$ becomes the only variable in Equation 3, $C_T$ is directly and linearly proportional to $R_2$, and meter 50 can be calibrated to read position directly on the $R_2$ dial. Detector 100 may be an A.C. ammeter or voltmeter. $R_2$ is preferably a decade resistance box, the values of resistance being stated in units of length, i.e. position relative to a reference plane.

The elements and operation of the present invention now having taken form, an appreciation of the objects becomes possible. Since positioner 10 functions both as a variable electrical parameter and as a positioning device, the need for a separate variable electrical parameter and linkages thereto is eliminated, thereby effecting a marked reduction in the size, cost, and complexity of equipment. The minimum values of $C_T$, it will be seen from Equations 1 and 2, are of substantial magnitude, resulting in more uniform sensitivity throughout the range of operation. The minimum values of $C_T$, being substantial, are further appreciated to minimize the relative effects of stray capacitance and variations in capacitance at various positions from the calibrated values. Since positioner 10 is completely closed, no dust or condensed vapors can gain access to the interior thereof; the use of oil from source 76 as a dielectric will further insure a stable dielectric of high leakage resistance. Obviously the random reliability associated with variable resistances and inductances, due to such factors as wear and contact resistance variations, is not encountered in positioner 10. The use of a decade resistance box for $R_2$ in bridge 98 further enhances the precision and reliability of the present invention. The theoretical analysis presented earlier clearly indicates the linear relationship of capacitance to position in positioner 10.

In the embodiment of the invention illustrated herein, positioner 10 is not only a positioner but also a variable electrical capacitance, so that the very means by which object 80 is positioned also provides an indication of the position of the object. Therefore, no auxiliary elements for monitoring the position of object 80, save leads 48 and 52, need reside within or adjacent to the structure housing the object. Essentially therefore, the objects of the present invention are accomplished satisfactorily.

Source 76 preferably supplies oil, rather than air or other fluid, to cylinder 14 and piston 38 via holes 39 and 30 due to the incompressibility, higher viscosity and resultant lower leakage, and higher dielectric constant of oil. It is also recognized that objects other than a neutron absorber in a nuclear reactor may be positioned and monitored by positioner 10 of the present invention. In the absence of coolant flow to urge object 80 to the left as viewed in FIG. 1, a substitute force such as that of a spring or gravity may be employed to urge the object counter to positioner 10.

Since variations, substitutions, modifications, and revisions within the scope of the present invention will undoubtedly occur to those skilled in the art, it is intended to limit the invention only by the appended claims.

What is claimed is:

1. A variable capacitor comprising a hollow metal cylinder having a first and second ends and inwardly extending end portions, a metal rod disposed within the cylinder in fixed space relationship and insulated therefrom, said rod having a first end adjacent to the first end of the cylinder and a second end adjacent to the second end of the cylinder, a hollow metal shaft disposed between the cylinder and the rod in electrical contact with the cylinder and insulated from the rod, said shaft having a second end variably extensible from the second ends of the rod and cylinder, and means to vary the position of the shaft with respect to the cylinder and rod.

2. The variable capacitor specified in claim 1 and further comprising a sealing-insulating bushing fixedly mounted on the first end of the rod and sealing the rod to the inwardly extending end portion of the cylinder at the first end thereof, an annular insulating disk fixedly mounted on the second end of the rod and slidable within the shaft, a sealing bushing fixedly mounted within one of the inwardly extending end portions of the cylinder at the second end thereof and slidably surrounding the shaft, and an annular insulating guide mounted slidably on the rod and within the cylinder, the guide being joined to the first end of the shaft, said second end of the shaft being closed, said means to vary the position of the shaft comprising means to insert a fluid under pressure within the cylinder and the shaft, the fluid inserting means acting on the interior of the shaft to cause movement thereof and to cause the first end of the shaft to move in the direction of the second end of the shaft.

References Cited in the file of this patent

UNITED STATES PATENTS

| | | |
|---|---|---|
| 1,950,237 | Gebhard et al. | Mar. 6, 1934 |
| 2,471,009 | Reason | May 24, 1949 |
| 2,544,012 | Edelman | Mar. 6, 1951 |
| 2,547,780 | Reynst | Apr. 3, 1951 |
| 2,724,273 | Sontheimer | Nov. 22, 1955 |

FOREIGN PATENTS

| | | |
|---|---|---|
| 65,305 | Norway | Sept. 2, 1939 |
| 938,682 | France | Oct. 21, 1948 |
| 625,199 | Great Britain | June 23, 1949 |